Feb. 2, 1965
A. LÖHR ETAL
3,167,923
BARRAGE CONSTRUCTION
Filed Aug. 10, 1961
2 Sheets-Sheet 1
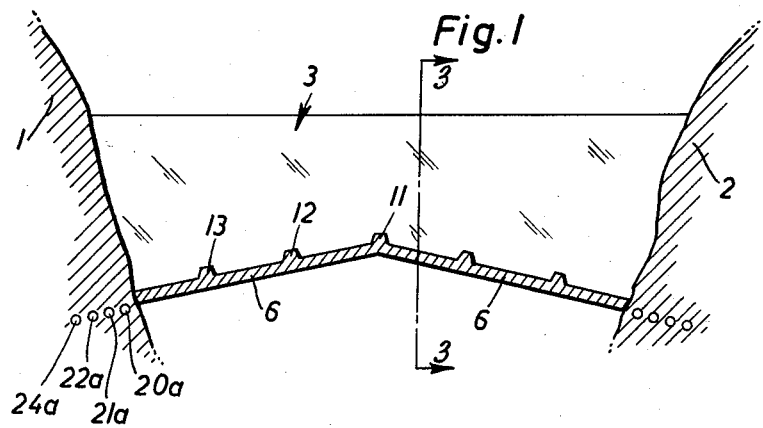
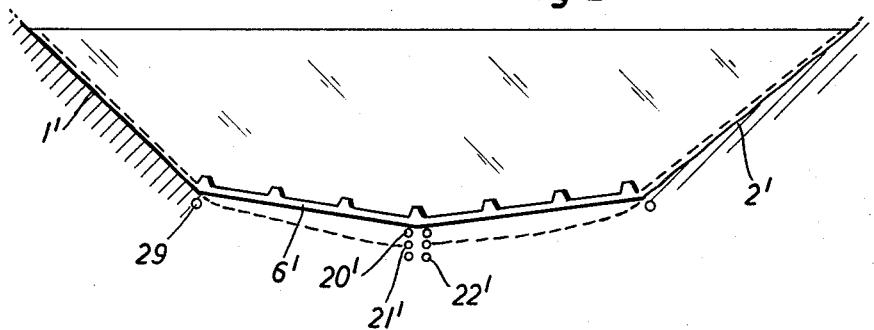
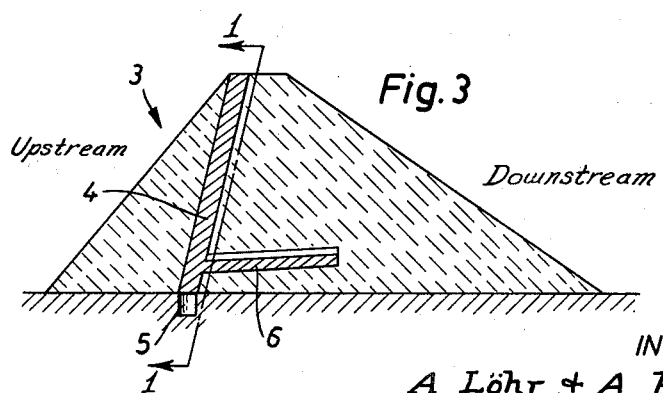
INVENTORS
A. Löhr + A. Feiner
BY
Lowry & Rinehart
ATTYS.

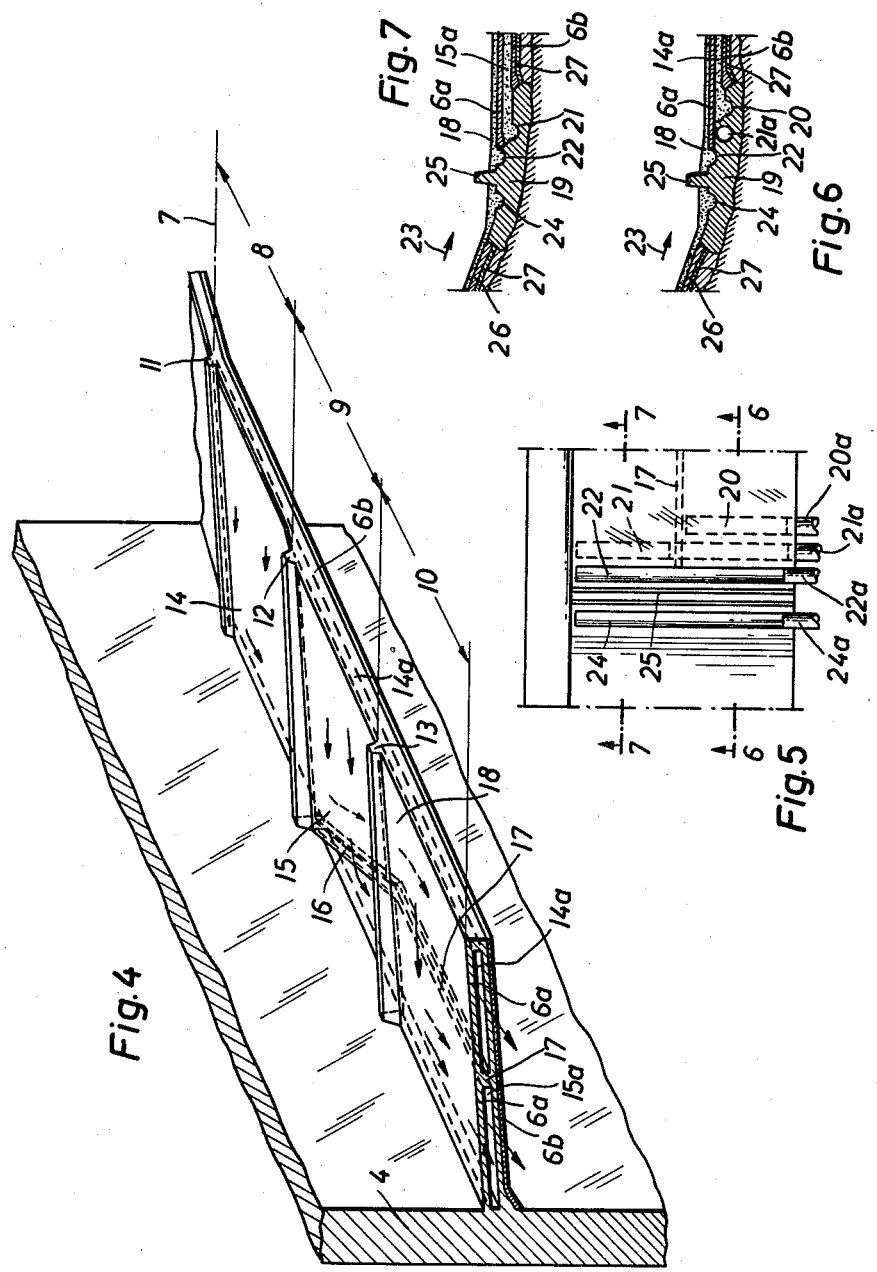

United States Patent Office 3,167,923
Patented Feb. 2, 1965

3,167,923
BARRAGE CONSTRUCTION
Albert Löhr, Richterstrasse 2, Cologne-Junkersdorf, Germany, and Alfred Feiner, Rheinaustrasse 10, Porz-Westhoven, Germany
Filed Aug. 10, 1961, Ser. No. 130,538
Claims priority, application Germany, Aug. 12, 1960, L 36,824
6 Claims. (Cl. 61—31)

This invention relates to a membrane layer for a barrage affording means to ascertain or control percolating waters.

It is known to provide in a barrage additional membrane layers which are connected to a main membrane layer. These additional membrane layers may be superposed and spaced from one another and extend so far into the interior of the barrage that they overlap at least the vertical projection of the overlying sections of the main membrane layer. These membrane layers may be connected all together or separately by pipe lines to a measuring device. The additional membrane layers extend into the interior of the barrage, the greater the distances between these additional membrane layers the more the main membrane layer is inclined. A single additional membrane layer may be sufficient if the main membrane layer is very steeply inclined.

With this arrangement of the membrane layers, control is effected merely in a horizontal direction. This means it may be determined from what height of the main membrane layer the percolating waters originate. It is however not possible to determine from what part of the length span of the main membrane layer or of the barrage the percolating waters originate.

The invention has for its object a further development of the additional membrane layers connected with the main membrane layer which makes it possible to determine where along the longitudinal extension of the barrage the main membrane is leaking i.e., water is percolating therethrough. The essential feature of the invention resides in that the main membrane layer of the barrage is connected with an additional membrane layer which is subdivided along the longitudinal direction of the barrage in several sections in such a manner that the drain layer serving for the derivation of the percolating waters from the higher section is arranged below the adjacent section of the membrane layer. In this manner it is possible to control the main membrane layer in a vertical direction. If superposed and spaced membrane layers are arranged in this manner, the whole surface of the main membrane layer may be controlled in a vertical direction as well as in a longitudinal direction of the barrage as regards an eventual leak. Each derivation of percolating waters is coordinated to a certain section of the main tightening layer. This additional subdivision may be effected merely in one of the additional membrane layers connected with the main membrane layer and it may also be sufficient that the additional membrane layer extending into the interior of the barrage be provided only at the bottom of the main membrane layer.

The derivation of the percolating waters may be effected in a transverse direction in the sides of the barrage. There may be provided in a longitudinal direction open grooves which extend in a transverse direction to the drain layers and which open into discharge pipes leading to a measuring device.

Other objects and advantages of the invention will be more apparent and more easily understood when referring to the following detailed specification, which describes the invention with reference to the related drawings. While the accompanying drawings illustrate an embodiment of the invention by way of example, it is to be understood that this invention shall not be limited to the precise details of construction as herein shown and described.

In the drawings:

FIG. 1 is a sectional view taken along line 1—1 of FIG. 3 and shows a rear view of the barrage extending between two sides of the water bed and an additional membrane layer connected to the main membrane layer for ascertaining the origin of percolating waters;

FIG. 2 shows a barrage extending between gradually sloping sides of the water bed, the derivation of the percolating waters being guided towards the center of the barrage;

FIG. 3 is a sectional view taken along line 3—3 of FIG. 1 of the barrage with the main membrane layer and shows the additional tightening layer connected therewith extending into the interior of the barrage;

FIG. 4 is a purely diagrammatic view of the additional membrane layer connected with the main tightening layer;

FIG. 5 is a plan view of the pipe connections arranged in a longitudinal direction on one side of the barrage; and FIGS. 6 and 7 are cross-sections on the lines 6—6 and 7—7 of FIG. 5.

Between the sides 1 and 2 of the water bed extends the barrage 3 which is provided with a primary or main membrane layer 4. The numeral 5 designates a cutoff wall formed from bitumen or cement concrete, with or without a control passage. With the main membrane layer 4 is connected a secondary or additional membrane layer 6 which extends so far into the interior of the barrage that this layer overlaps at least the vertical projection of the overlying sections of the main membrane layer or of the whole main membrane layer.

The membrane layer 6 is subdivided in a longitudinal direction of the barrage in several sections. To each section is coordinated a separated accumulation and derivation of the percolating waters. In the illustrated example, the membrane layer 6 is subdivided in a longitudinal direction of the barrage in three sections 8, 9 and 10, starting from the center 7 which is provided with a transverse wall 11. These sections are separated from one another by upwardly extending transverse walls 12 and 13. The membrane layer 6 consists of two layers, namely, an upper layer $6^a$ and a lower layer $6^b$. In section 8 there is provided above lower layer $6^b$ a drain layer 14 which ends at wall 12 and which continues in a drain layer $14^a$ arranged in the sections 9 and 10 between the upper layer $6^a$ and the lower layer $6^b$. In section 9 there is provided above upper layer $6^a$ a drain layer 15 which ends at wall 13 and which continues in a drain layer $15^a$ which is likewise arranged between upper layer $6^a$ and lower layer $6^b$. The drain layers $14^a$ and $15^a$ are arranged side by side and are separated from one another by tight partition walls 16 and 17. The arrangement may also be such that the drain layers lie one beneath the other. There may be provided any desired number of sections. In section 10 there is provided a drain layer 18 above the upper layer $6^a$. For the derivation there may be provided instead of the drain layers $14^a$, $15^a$ a system of pipes.

For derivation of the percolating waters from the drain layers of the different sections there are provided corresponding collecting pipes on one side of the barrage. The barrage may, for example, be provided with a body 19 of concrete extending in a longitudinal direction of the side of the water bed and receiving the collecting pipes. The upper layer $6^a$ and the lower layer $6^b$ may join this body 19 at different heights. The percolating waters are first collected in open grooves 20, 21, 22 where the drain layers $14^a$, $15^a$ and 18 end. Outside the width of the additional layer 6 connected with the main membrane layer 4, the grooves 20, 21, 22 open into the corresponding pipes 20ª, 21ª, 22ª. The percolating waters running down the slope 23 of the side are collected in the groove 24 and are derivated by the pipe 24ª. To separate the percolating waters of the barrage and of the side of the water bed, the concrete body 19 is provided with a partition wall 25 which extends at the boundary between the slope 23 of the side and the additional membrane layer 6 in a transverse direction to the same. The concrete body 19 is suitably joined at the side of the slope 23 by another layer 26.

The drain layers 14, 14ª, 15, 15ª and 18 may be gravel layers. The layers 6ª, 6ᵇ and 26 may consist of asphalt concrete above which is provided a layer of mastic. Below the layers of asphalt concrete is suitably provided in the usual manner an expansion layer 27.

FIG. 2 illustrates an arrangement in which the additional membrane layer 6' slopes from the sides 1', 2' of the water bed towards the center of the barrage. The collecting pipes 20', 21', 22' are arranged in the center of the barrage and discharge into a measuring device. There is suitably provided a special drainage 29 for the side of the water bed and the percolating waters are likewise derivated towards the center. The pipes for the derivation of the percolating waters from the sections of the additional membrane layer may be arranged in various manner.

From the foregoing, it will be apparent that suitable means has been provided to attain the desired end. Although several embodiments of the invention have been disclosed, it will be apparent that other modifications may be made within the spirit and scope of the invention as defined in the appended claims.

We claim:
1. A barrage construction comprising a body member for extending transversely and vertically of a water bed for impeding the flow of water thereby, said body member including primary membrane means extending the span and height of said body member for intercepting percolating water and causing it to descend along said primary membrane means, said body member including secondary membrane means disposed horizontally at the base of said primary membrane means and extending the span of said body member, said second membrane means comprising a plurality of horizontally disposed overlying passage portions communicating with said end face of said primary membrane means along isolated span sections and independent of said vertical surface, said passage portions providing means to catch water percolating along the isolated span sections with which the passage portion communicates, and section conduit means connected to each of said passage portions for conducting percolating water therefrom.

2. The structure of claim 1 in which said secondary membrane means extends angularly from a vertical plane passing substantially through the said body member and forms two separate drainage sections on opposite sides of said vertical plane.

3. The structure of claim 2 in which said separate passage portions are disposed horizontally in overlapping planar relation.

4. The structure of claim 2 in which each of said passage portions is respectively connected to independent drainage conduits for measuring independent water flow in said respective passage portions.

5. The structure of claim 1 in which said primary membrane means is disposed substantially vertical, and said secondary membrane means extends laterally beneath a vertical plane passing through the uppermost portion of said primary membrane means.

6. The structure of claim 1 in which said passage portions comprise parallel and overlying passage portions each receiving percolating water from one of said span sections.

References Cited by the Examiner
UNITED STATES PATENTS 2,178,916  11/39  Neuman  61—30
2,217,470  10/40  Collier  61—30

FOREIGN PATENTS 1,040,972  10/58  Germany.

JACOB L. NACKENOFF, *Primary Examiner.*
JACOB SHAPIRO, *Examiner.*